US007684967B2

(12) United States Patent
Wallis et al.

(10) Patent No.: US 7,684,967 B2
(45) Date of Patent: Mar. 23, 2010

(54) APPARATUS, METHOD AND SYSTEM FOR IMPROVED RESERVOIR SIMULATION USING AN ALGEBRAIC CASCADING CLASS LINEAR SOLVER

(75) Inventors: John Wallis, Sugar Land, TX (US); Hamdi A. Tchelepi, San Mateo, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 901 days.

(21) Appl. No.: 11/453,304

(22) Filed: Jun. 14, 2006

(65) Prior Publication Data

US 2007/0010979 A1 Jan. 11, 2007

Related U.S. Application Data

(60) Provisional application No. 60/690,319, filed on Jun. 14, 2005.

(51) Int. Cl.
G06G 7/48 (2006.01)
(52) U.S. Cl. .............................. 703/10; 703/2; 345/420; 345/629
(58) Field of Classification Search .................. 703/2, 703/10
See application file for complete search history.

(56) References Cited

U.S. PATENT DOCUMENTS 6,662,146 B1  12/2003  Watts (Continued)

FOREIGN PATENT DOCUMENTS

WO    WO-01/40937    6/2001

OTHER PUBLICATIONS

Haase et al, "Parallel AMG on Distributed Memory Computers", SIAM J. Sci. Comp. 24(2), 2002.*

(Continued)

Primary Examiner—Paul L Rodriguez
Assistant Examiner—Mary C Jacob
(74) Attorney, Agent, or Firm—Osha Liang LLP

(57) ABSTRACT

A method, system, a program storage device and apparatus are disclosed for conducting a reservoir simulation, using a reservoir model of a region of interest, wherein the region of interest has been gridded into cells. Each cell has one or more unknown variable. Each cell has a node. A graph of the nodes is represented by a sparse matrix. The graph is an initially decomposed into a pre-specified number of domains, such that each cell exists in at least one domain. The cells and domains are numbered. Each cell has a key, the key of each cell is the set of domain numbers to which the cell belongs. Each cell has a class, the class of each cell being the number of elements in the cell. The cells are grouped into connectors, each connector being the set of cells that share the same key. Each connector having a connector class, the connector class being the number of elements in the key of the connector. Each connector having only one higher-order neighbor connector is merged with such higher-order neighbor connector. The class of all locally maximum class connectors is reset to the maximum class of held by any connector. The maximum class connector is forced to contain only one cell. The connectors are ordered in increasing order of class. Interpolation operator and restriction operator are constructed from the ordered connectors. The interpolation operator and restriction operator are used to construct a coarse grid. The coarse grid may be used to determine the unknown variables of the cells.

57 Claims, 13 Drawing Sheets

U.S. PATENT DOCUMENTS

| | | | |
|---|---|---|---|
| 6,810,370 B1 * | 10/2004 | Watts, III | 703/10 |
| 6,823,297 B2 * | 11/2004 | Jenny et al. | 703/2 |
| 6,928,399 B1 * | 8/2005 | Watts et al. | 703/2 |
| 2006/0235667 A1 * | 10/2006 | Fung et al. | 703/10 |

OTHER PUBLICATIONS

Griebel et al, "Flow Field Clustering via Algebraic Multigrid", IEEE Visualization 2004, Oct. 2004, Austin, Texas.*

Watts et al, WO-01/40937, PCT/US00/31986, Exxon Mobil Upstream Research Company, Jun. 7, 2001.*

Aftosmis et al, "A Parallel Multilevel Method for Adaptively Refined Cartesian Grids with Embedded Boundaries", 38th Aerospace Sciences Meeting and Exhibit, Jan. 10-13, 2000, Reno, NV.*

Hulsemann et al, "gridlib—A Parallel, Object-oriented Framework for Hierarchical-hybrid Grid Structures in Technical Simulation and Scientific Visualization", High Performance Computing in Science and Engineering, Munich 2004, pp. 37-50.*

Kinoshita et al, "A Parallel Adaptive Mesh Approach for Flowfields with Shock Waves", Shock Waves 12:167-175, 2002.*

Shiralkar et al, "Development and Field Application of a High Performance, Unstructured Simulator with Parallel Capability", SPE 93080, SPE Reservoir Simulation Symposium, Houston, Texas, Jan. 31-Feb. 2, 2005.*

Jenny et al, "Multi-Scale Finite-Volume Method for Elliptic Problems in Subsurface Flow Simulation", Journal of Computational Physics 187, pp. 47-67, 2003.*

Schulze, "Towards a Tighter Coupling of Bottom-Up and Top-Down Sparse Matrix Ordering Methods", BIT, vol. 41, No. 4, pp. 800-841, 2001.*

Aziz, K and Settari, A.: "Petroleum Reservoir Simulation," Elsevier Applied Science Publishers, London, 1979. (Chapters 2 and 8), 51 pages.

Thomas, G.W. and Thurnau, D.H.; "Reservoir Simulation Using an Adaptive Implicit Method," SPEJ (Oct. 1983), 10 pages.

Forsyth, Jr. P.A. and Sammon, P.H.: "Practical Considerations for Adaptive Implicit Methods in Reservoir Simulation," Journal of Computational Physics (Feb. 1986) vol. 62, No. 2., 17 pages.

Behie, G.A. and Vinsome, P.K.: "Block Iterative Methods for Fully Implicit Reservoir Simulation," SPE 9303, Presented at the 55th Annual Fall Technical Conference and Exhibition, Dallas, TX, Sep. 21-24, 1980, 11 pages.

Russell, T.F.: "Stability Analysis and Switching Criteria for Adaptive Implicit Methods Based on the CFL Condition," SPE 18416 Presented at the SPE Symposium on Reservoir Simulation, Houston, TX, Feb. 6-8, 1989, 11 pages.

Young, L.C. and Russell, T.F.: "Implementation of an Adaptive Implicit Method," SPE 25245 Presented at the SPE Symposium on Reservoir Simulation, Houston, Texas, Feb. 28-Mar. 3, 1993, 14 pages.

Watts, J.W. and Rame, M.: "An Algebraic Approach to the Adaptive Implicit Method," SPE 51900, Presented at the SPE Symposium on Reservoir Simulation, Houston, Texas, Feb. 14-17, 1999, 10 pages.

Behie, G.A., Forsyth Jr., P.A. and Sammon, P.H., "Adaptive Implicit Methods Applied to Thermal Simulation," SPE Reservoir Engineering, Nov. 1987, pp. 596-598, 3 pages.

Wallis, J.R.: "Incomplete Gaussian Elimination as a Preconditioning for Generalized Conjugate Gradient Acceleration," SPE 12265, Presented at the SPE Symposium on Reservoir Simulation, San Francisco, California, Nov. 15-18, 1983, 10 pages.

Wallis, J.R., Kendall, R.P., and Little, T.E.: "Constrained Residual Acceleration of Conjugate Residual Methods," SPE 13536, Presented at the SPE Symposium on Reservoir Simulation, Houston, Texas, Feb. 10-13, 1985, 14 pages.

Coats, K.H.: "A Note on IMPES and Some IMPES-Based Simulation Models," SPEJ (5) No. 3, Sep. 2000, pp. 245-251, 7 pages.

Coats, K.H.: "IMPES Stability: Selection of Stable Timesteps," SPEJ, Jun. 2003, pp. 181-187, 7 pages.

Saad, Y., "Iterative Methods for Sparse Linear Systems," 2nd edition, SIAM, Philidelphia, PA, 2003, Chapters 13 and 14, 86 pages.

Saad, Y. and Schultz, M.H., "GMRES: A Generalized Minimal Residual Algorithm for Solving Nonsymmetric Linear Systems," SIAM Journal on Scientific and Statistical Computing, 7, pp. 856-869, 1986, 14 pages.

Vinsome, P.K.W.: "Orthomin, an Iterative Method for Solving Sparse Sets of Simultaneous Linear Equations," SPE 5729, Presented at the Fourth Symposium of Numerical Simulation of Reservoir Performance of the Society of Petroleum Engineers of AIME held in Los Angeles, California, Feb. 19-20, 1976, 11 pages.

Smith, B., Bjorstad, P. and Gropp, W.: "Domain Decomposition: Parallel Multilevel Methods for Elliptic Partial Differential Equations," Cambridge University Press, 1996, Chapter 3, 35 pages.

Stone, H.L. and Garder, Jr., A.O.: Analysis of Gas-Cap or Dissolved-Gas Drive Reservoirs, AIME, 1961, vol. 222, 13 pages.

Peaceman, D.: "Fundamentals of Numerical Reservoir Simulation," published by Elsevier Scientific Publishing Company, London, 1977, Chapter 1, 20 pages.

Debaun, D., et al. "An extensible architecture for next generation scalable parallel reservoir simulation" Society of Petroleum Engineers, vol. SPE, No. 93274, Jan. 31, 2005-Feb. 2, 2005, pp. 1-13, XP-002403624.

Collins, D.A., et al, "A shared-memory parallel black-oil simulator with a a parallel ILU linear solver" Society of Petroleum Engineers, vol. SPE, No. 79713, Feb. 3, 2003-Feb. 5, 2003, pp. 1-9, XP-002403625.

International Search Report for International Application No. PCT/US2006/023433, Mailed on Nov. 2, 2006 (4 pages).

* cited by examiner

APPARATUS, METHOD AND SYSTEM FOR IMPROVED RESERVOIR SIMULATION USING AN ALGEBRAIC CASCADING CLASS LINEAR SOLVER

RELATED APPLICATIONS

This claims priority from U.S. Provisional Patent Application 60/690,319 filed Jun. 14, 2005.

BACKGROUND OF THE INVENTION

1. Field of the Invention

This invention relates to apparatuses, methods and systems for use in reservoir simulation. In particular, the invention provides methods, apparatuses and systems for more effectively and efficiently simulating fluid flow in reservoirs using an algebraic cascading class linear solver.

2. Background

Reservoir simulation often requires the numerical solution of the equations that describe the physics governing the complex behaviors of multi-component, multiphase fluid flow in natural porous media in the reservoir and other types of fluid flow elsewhere in the production system. The governing equations typically used to describe the fluid flow are based on the assumption of thermodynamic equilibrium and the principles of conservation of mass, momentum and energy, as described in Aziz & Settari, 1977. The complexity of the physics that govern reservoir fluid flow leads to systems of coupled nonlinear partial differential equations that are not amenable to conventional analytical methods. As a result, numerical solution techniques are necessary.

A variety of mathematical models, formulations, discretization methods, and solution strategies have been developed and are associated with a grid imposed upon an area of interest in a reservoir. Detailed discussions of the problems of reservoir simulation and the equations dealing with such problems can be found, for example, in a PCT published patent application to ExxonMobil, International Publication No. WO 01/40937, incorporated herein by reference and in U.S. Pat. No. 6,662,146 B1, incorporated herein by reference. If a grid imposed upon an area of interest in a reservoir is used, the grid may be structured or unstructured. Such grids are comprised of cells, each cell having one or more unknown properties, but with all the cells in the grid having pressure as an unknown. Other unknown properties include, but are not limited to, fluid properties such as water saturation or temperature, for example, or to "rock properties," such as permeability or porosity to name a few. A cell treated as if it has only a single unknown (typically pressure) is called herein a "single variable cell," while a cell with more than one unknown is called herein a "multi-variable cell."

A matrix can be constructed to represent the gridded region of interest based on the different types of cells.

The following equation is used to solve for the unknown variables, called x:

$$Ax=b \tag{Eq 1}$$

where x is a block vector of the variables representing unknown properties of the cells and b is a block vector of known quantities. Block vector x and block vector b are the same length. Approaches to solving this problem include: Domain Multisector Decomposition (Cleve Ashcraft), Wirebasket Domain Decomposition (Barry Smith), Heirarchical interface decomposition (Henon & Saad), and GMRES (Saad & Shultz). But the problem specifically addressed by the current invention includes solving linear systems associated with large-scale heterogeneous problems for both structured and unstructured grids. The solution must be robust, computationally efficient with excellent convergence rate. The focus is on developing a scalable (i.e., efficient for very large problems) multi-level algebraic approach that relies completely on information contained in the linear system of equations that must be solved. Moreover, it is also essential that the solution be well suited for parallel computation. These requirements pose a great challenge, especially for strongly heterogeneous unstructured-grid problems, and existing methods, including Incomplete Upper-Lower (ILU) factorization and nested factorization, fall well short of meeting all of these essential requirements.

SUMMARY OF THE INVENTION

In view of the above problems, an object of the present invention is to provide methods, apparatuses and systems for more effectively and efficiently simulating fluid flow in reservoirs while eliminating or minimizing the impact of the problems and limitations described.

While some of the description herein is focused upon dealing with linear system of equations governing the pressure in general-purpose reservoir simulation problems, the present invention is also applicable to AIM (adaptive implicit method) and fully implicit linear systems.

The present invention includes a method for conducting a reservoir simulation with the use of a reservoir model of a region of interest of the reservoir. The region of interest has been gridded into a plurality of cells, each cell having one or more unknown variable and each cell having a node. The steps of the method include creating a graph of the cell nodes; imposing an initial decomposition of the graph into a pre-specified number of domains, such that each cell exists in at least one domain; numbering the cells and the domains, each cell having a key and each cell having a class, wherein the key of each cell is the set of domain numbers to which the cell belongs and the class of each cell being the number of elements in the cell's key; grouping the cells into connectors, each connector being the set of cells that share the same key, with each connector having a connector class, the connector class being the number of elements in the key of each connector; performing a connector reduction step; resetting the class of all locally maximum class connectors to the maximum class held by any connector; forcing the maximum class connectors to contain only one cell; ordering the connectors in increasing order of class; constructing interpolation operator and restriction operator from the ordered connectors; and using the interpolation operator and restriction operator to construct a coarse grid. The coarse grid may be used to determine the unknown variables of the cells. The results of the simulation to may be used to identify opportunities for improving production from the reservoir. One or more of these opportunities may be acted upon to improve production from the reservoir. The gridding may be structured or unstructured. The graph may be two or three dimensional. The simulation may be displayed. The connector reduction step may include merging each connector having only one higher-order neighbor connector with such higher-order neighbor connector. A sparse matrix may be used to represent the graph, the sparse matrix taking the form of $A=\{a_{ij}\}_{i,j=1}^n$ where n is the number of cells.

The present invention includes a program storage device readable by a machine, tangibly embodying a program of instructions executable by the machine to perform method steps for conducting a reservoir simulation using a reservoir model wherein a region of interest has been gridded into a plurality of cells. Each cell has one or more unknown variable and each cell has a node. The methods steps may include creating a graph of the cell nodes; imposing an initial decomposition of the graph into a pre-specified number of domains, such that each cell exists in at least one domain; numbering the cells and the domains, each cell having a key and each cell having a class, wherein the key of each cell is the set of domain numbers to which the cell belongs and the class of each cell being the number of elements in the key of the cell; grouping the cells into connectors, each connector being the set of cells that share the same key, with each connector having a connector class, the connector class being the number of elements in the key of each connector; performing a connector reduction step; resetting the class of all locally maximum class connectors to the maximum class held by any connector; forcing the maximum class connector to contain only one cell; ordering the connectors in increasing order of class; constructing interpolation operator and restriction operator from the ordered connectors; and using the interpolation operator and restriction operator to construct a coarse grid. The method steps of program storage device may further include using the coarse grid to determine the unknown variables of the cells. The program storage device may be used for hydrocarbon reservoirs the method steps of the program storage device may also include using results of the simulation to identify opportunities for improving production from the reservoir. The grid may be structured or unstructured. The graph may be two dimensional. The graph may be three dimensional. The method steps of the program storage device may further include displaying the simulation. The simulation may be displayed on many types of display systems, such as for example a computer monitor or a three dimensional display system. The connector reduction step may include merging each connector having only one higher-order neighbor connector with such higher-order neighbor connector. A sparse matrix may be used to represent the graph, the sparse matrix taking the form of $A=\{a_{ij}\}_{i,j=1}^{n}$ where n is the number of cells. The program storage device may comprise a compact disk. The program storage device may comprise memory on a computer hard drive.

The present invention includes a simulation apparatus responsive to input data, adapted for solving a system of linear equations that represent a particular entity, said simulation apparatus generating a set of simulation results when said system of linear equations are solved, said set of simulation results including one or more parameters which characterize said particular entity. A representation of the entity has been gridded into cells, each cell having one or more unknown variable and each cell having a node. The simulation apparatus includes a means for graphing the cell nodes; a means for imposing an initial decomposition of the graph into a pre-specified number of domains, such that each cell exists in at least one domain; a second means for numbering the cells and the domains; an assigning means for assigning each cell a key such that the key of each cell is the set of domain numbers to which the cell belongs; a second assigning means for assigning each cell a class, the class of each cell being the number of elements in the cell's key; a grouping means for grouping the cells into connectors, each connector being the set of cells that share the same key, with each connector having a connector class, the connector class being the number of elements in the key of each connector; a connector reduction means; a reset means for resetting the class of all locally maximum class connectors to the maximum class held by any connector; a limiting means to force the maximum class connector to contain only one cell; an ordering means to order the connectors in increasing order of class; a means to construct interpolation operator and restriction operator from the ordered connectors; and a second constructing means to use the interpolation operator and restriction operator to construct a coarse grid. The simulation apparatus may also include a determining means for using the coarse grid to determine the unknown variables of the cells. If the particular entity is a hydrocarbon reservoir, the simulation apparatus may also include means for using results from the simulation apparatus to identify opportunities for improving production from the reservoir. If the particular entity is a water producing reservoir, the simulation apparatus may also include means for using results from the simulation apparatus to identify opportunities for improving production from the reservoir or for inhibiting salt water contamination of the reservoir. The grid may be structured or unstructured. The graph may be two dimensional. The graph may be three dimensional. The simulation apparatus may also include display means for displaying the simulation. The display means may include a computer monitor. The display means may include a three dimensional display system. The connector reduction means may include identifying each connector having only one higher-order neighbor connector and merging each such connector with its higher-order neighbor connector. A sparse matrix is used to represent the graph, the sparse matrix taking the form of $A=\{a_{ij}\}_{i,j=1}^{n}$ where n is the number of cells.

The present invention includes an apparatus responsive to a set of input data for displaying a gridded representation of an earth formation. The gridded representation is comprised of a plurality of grid cells and a plurality of simulation results associated with, respectively, with the plurality of cells. Each cell has one or more unknown variables and each cell has a node. The apparatus includes a means for creating a graph of the cell nodes; a means for imposing an initial decomposition of the graph into a pre-specified number of domains, such that each cell exists in at least one domain; a second means for numbering the cells and the domains, an assigning means for assigning each cell a key such that the key of each cell is the set of domain numbers to which the cell belongs; a second assigning means for assigning each cell a class, the class of each cell being the number of elements in the cell's key; a grouping means for grouping the cells into connectors, each connector being the set of cells that share the same key, with each connector having a connector class, the connector class being the number of elements in the key of each connector; a connector reduction means; a reset means for resetting the class of all locally maximum class connectors to the maximum class held by any connector; a limiting means to force the maximum class connector to contain only one cell; an ordering means to order the connectors in increasing order of class; a means to construct interpolation operator and restriction operator from the ordered connectors; a second constructing means to use the interpolation operator and restriction operator to construct a coarse grid. The apparatus may also include a determining means for using the coarse grid to determine the unknown variables of the cells. The apparatus may also include means for using results of the simulation to identify opportunities for improving production from the earth formation. The grid may be structured or unstructured. The graph may be two dimensional. The graph may include three dimensions. The apparatus may include a display for displaying the simulation. The display may be many things including but not limited to a computer monitor or a three-dimensional display system. The connector reduction means may include merging each connector which has only one higher-order neighbor connector with such higher-order neighbor connector. A sparse matrix is used to represent the graph, the sparse matrix taking the form of $A=\{a_{ij}\}_{i,j=1}^{n}$ where n is the number of cells.

The invention includes a method for conducting a reservoir simulation with the use of a reservoir model of a zone of interest, the zone of interest having been gridded into a plurality of cells. Each cell has one or more unknown variables. The method steps include imposing an initial decomposition of the grid into a pre-specified number of regions, such that each cell exists in at least one region; numbering the cells and the regions, each cell having a key and each cell having a class, wherein the key of each cell is the set of region numbers to which the cell belongs and the class of each cell being the number of elements in the cell's key; grouping the cells into connectors, each connector being the set of cells that share the same key, with each connector having a connector class, the connector class being the number of elements in the key of each connector; performing the connector reduction step; resetting the class of all locally maximum class connectors to the maximum class held by any connector; forcing the maximum class connectors to contain only one cell; ordering the connectors in increasing order of class; constructing interpolation operator and restriction operator from the ordered connectors; and using the interpolation operator and restriction operator to construct a coarse grid. The method may also include using the coarse grid to determine the unknown variables of the cells. The gridding may structured or unstructured. The graph may be two dimensional or more than two dimensional. The method may include displaying the simulation. The connector reduction means may include merging each connector which has only one higher-order neighbor connector with such higher-order neighbor connector.

The invention includes a program storage device readable by a machine, tangibly embodying a program of instructions executable by the machine to perform method steps for conducting a reservoir simulation using a reservoir model wherein a zone of interest has been gridded into a plurality of cells. Each cell has one or more unknown variables. The method steps may include imposing an initial decomposition of the grid into a pre-specified number of regions, such that each cell exists in at least one region; numbering the cells and the region s, each cell having a key and each cell having a class, wherein the key of each cell is the set of region numbers to which the cell belongs and the class of each cell being the number of elements in the key of the cell; grouping the cells into connectors, each connector being the set of cells that share the same key, with each connector having a connector class, the connector class being the number of elements in the key of each connector; performing a connector reduction step; reset the class of all locally maximum class connectors to the maximum class held by any connector; force the maximum class connector to contain only one cell; order the connectors in increasing order of class; construct interpolation operator and restriction operator from the ordered connectors; use the interpolation operator and restriction operator to construct a coarse grid; and use the coarse grid to determine the unknown variables of the cells.

Other objects, features and advantages of the present invention will become apparent to those of skill in art by reference to the figures, the description that follows and the claims.

BRIEF DESCRIPTION OF THE DRAWINGS

FIG. 1b illustrates an exploded view of a section in the reservoir depicted in FIG. 1a.

DETAILED DESCRIPTION OF THE DRAWINGS

In the following detailed description of the preferred embodiments and other embodiments of the invention, reference is made to the accompanying drawings. It is to be understood that those of skill in the art will readily see other embodiments and changes may be made without departing from the scope of the invention.

Figure 1A:
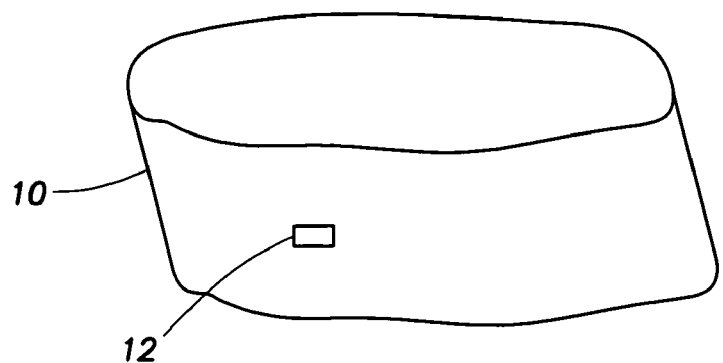
FIG. 1a illustrates a representation of a reservoir.
Figure 1B:
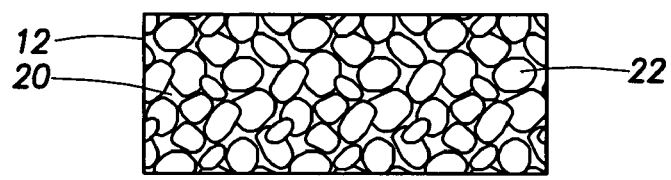

FIG. 1a illustrates a representation of a reservoir 10, with a section 12, which is depicted in an exploded (two dimensional) view in FIG. 1b. Reservoirs 10 (below the water table) typically contain fluid 20, such as oil, gas, water or a mixture of two or three of those substances filling the pore spaces between the porous media 22 (such as, for example, sandstone or limestone) that makes up the rock of the reservoir.

Figure 2A:
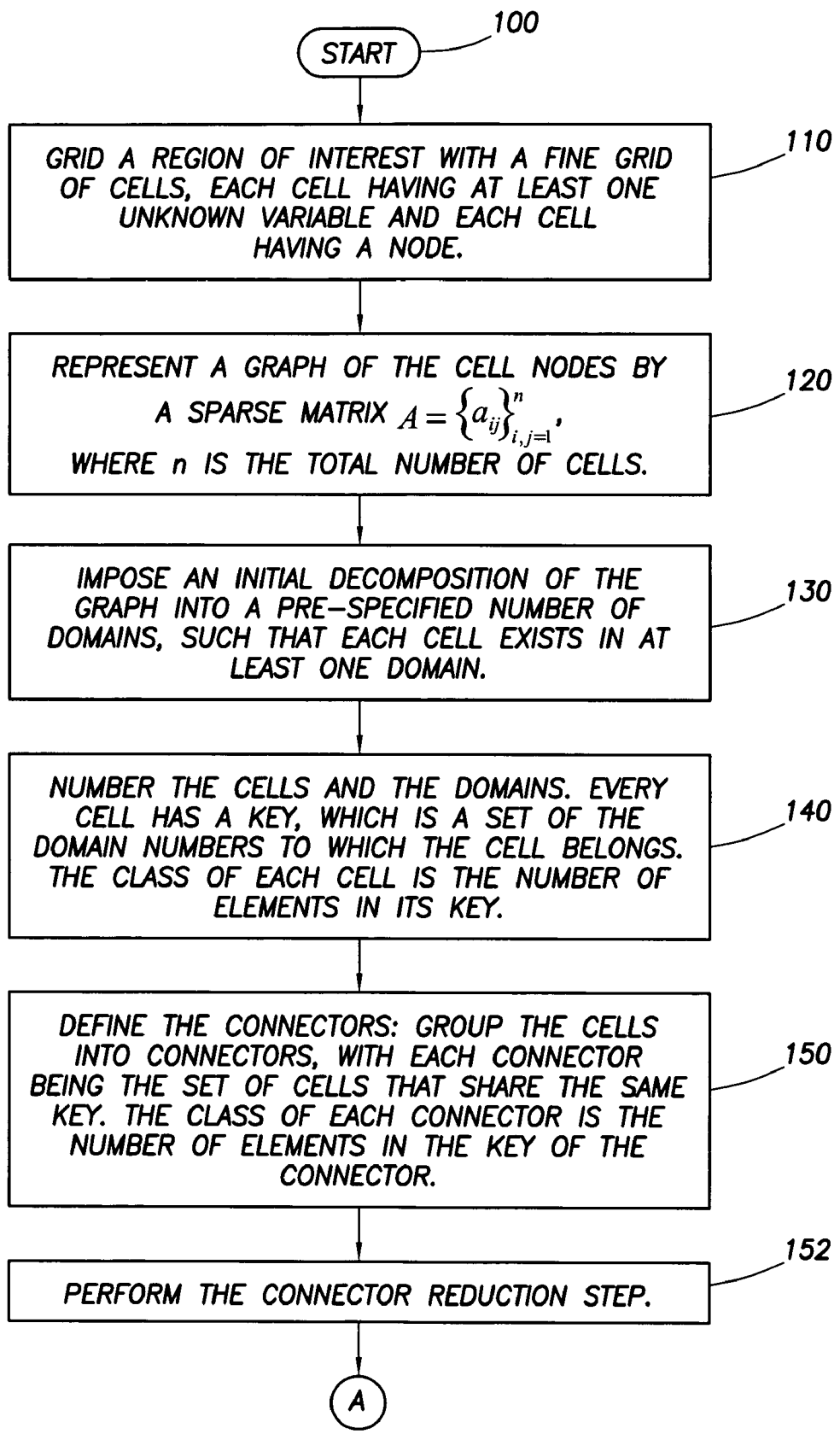
FIG. 2 is a flowchart of a preferred embodiment of the present invention.
Figure 2B:
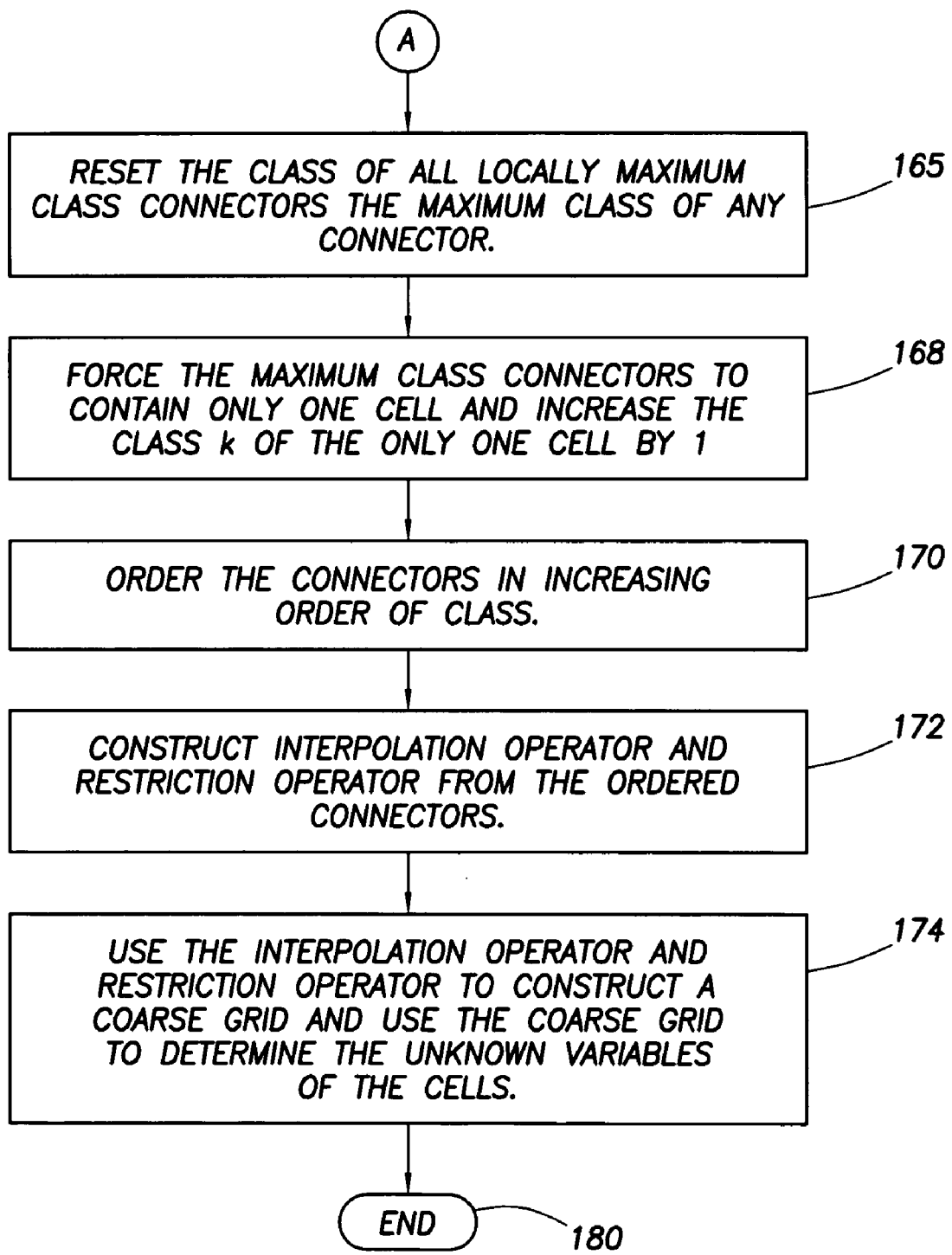

FIG. 2 depicts a flowchart of a preferred embodiment of the present invention. After starting 100, the first step is to grid 110 a region of interest into cells, each cell having a node in its center. Represent 120 a graph of the cell nodes by a sparse matrix:

$$A=\{a_{ij}\}_{i,j=1}^{n} \qquad (Eq\ 2)$$

where n is the total number of cells. FIG. 2 is further discussed herein.

Figure 3:
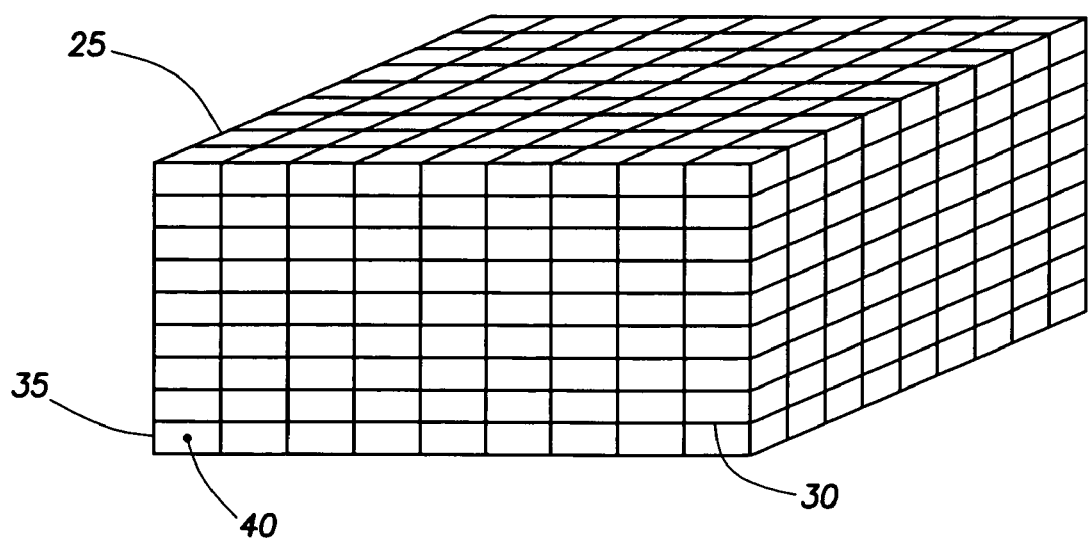
FIG. 3 depicts a simplified, three-dimensional view of a region of interest in a reservoir, gridded in accordance with a preferred embodiment of the present invention.

FIG. 3 depicts a three-dimensional view of a region of interest 25 in a reservoir (not separately depicted in FIG. 3), finely gridded in accordance with a preferred embodiment of the invention. The grid 30 divides the region of interest 25 into cells 35, each cell 35 having a node 40 (only one depicted in FIG. 3) at its center. Although a structured grid is depicted in FIG. 3, the gridding of this invention may be structured or unstructured. Given a grid, the equations that describe the physics are descretized on this grid (there are many different discretization schemes that one can employ). The result can be represented as a graph (i.e., nodes and edges). This "graph" is a complete, yet quite general, representation that is valid regardless of the nature of underlying grid (e.g., structured or unstructured) or the method of discretizing the equations on that grid.

Figure 4:
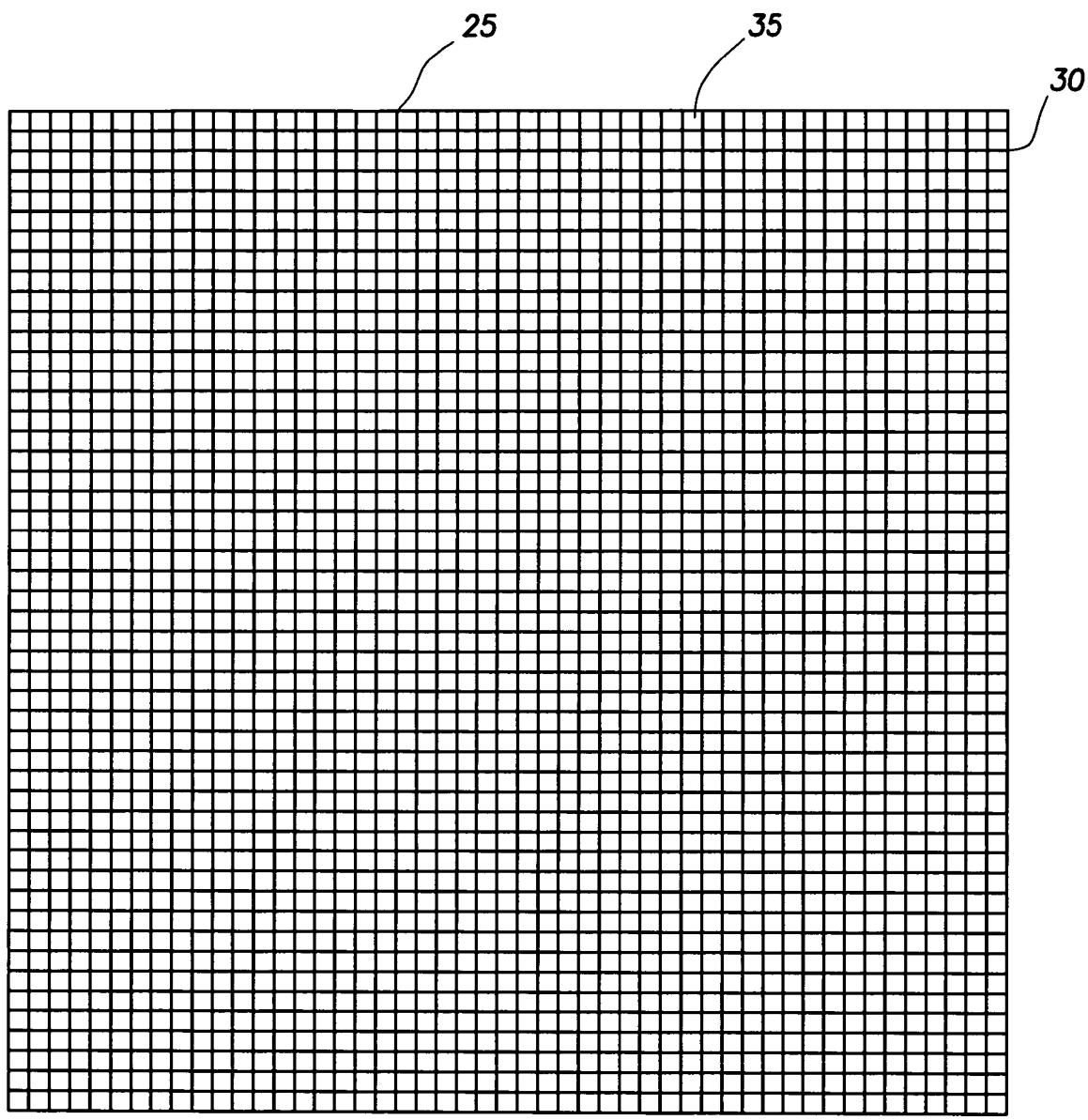
FIG. 4 depicts a two-dimensional view of a region of interest 25 in a reservoir (not separately depicted in FIG. 4), finely gridded in accordance with a preferred embodiment of the invention

FIG. 4 depicts a two-dimensional view of a region of interest 25 in a reservoir (not separately depicted in FIG. 4), finely gridded in accordance with a preferred embodiment of the invention. As with FIG. 3, the grid 30 divides the region of interest 25 into cells 35. The fine grid 30 in FIG. 4 is 49 by 49. The center of each cell 35 in FIG. 4 is a node 40 but the nodes are not separately depicted in FIG. 4.

Each node 40 is a mathematical center of a cell. One may connect nodes of the cells in a nodal graph.

Figure 5:
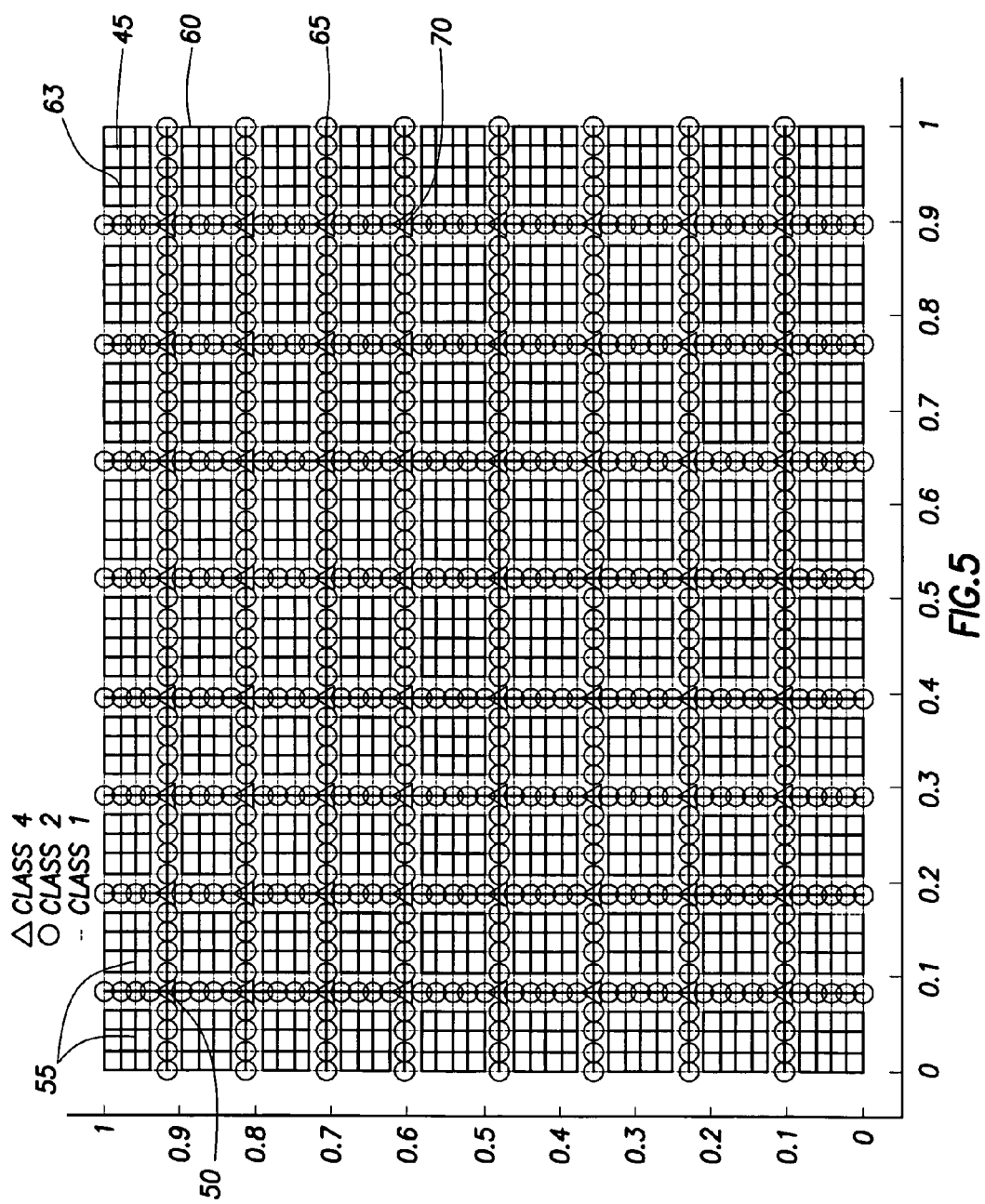
FIG. 5 depicts a simplified, two-dimensional view of a region of interest in a reservoir, the region of interest having been gridded into cells, in accordance with a preferred embodiment of the present invention.

FIG. 5 depicts a preferred embodiment of the present invention with a simplified, two-dimensional view of a region of interest 25 in a reservoir, the region of interest 25 having been gridded into cells, such as cell 45, each cell 45 having a node at its center. Nodal graphs 50, 55 (which have the graph lines passing through the nodes of the cells) are imposed upon the grid in accordance with a preferred embodiment of the present invention. The grid in FIG. 5 includes an eight by eight, coarse nodal graph 50, superimposed on a 49 by 49 fine nodal graph 55. This results in eighty-one overlapped domains 60, having overlap 65 on the lines of the eight by eight nodal graph. FIG. 5 also depicts intersections 63, edges 65 and vertices, such as vertex 70, of the nodal graphs. Three dimensional examples would also include faces, not depicted in FIG. 5.

The overlaps 65 depicted in FIG. 5, which separate domains from each other, are also called multisectors. Adding a domain to its multisectors, yields overlapped domains, $\hat{D}_i$.

Referring back to FIG. 2, impose 130 an initial decomposition of the graph into a pre-specified number of overlapped domains, such that each cell exists in at least one overlapped domain. In FIG. 5, the pre-specified number of domains would be the eighty-one (81) overlapped domains 60. The next step in FIG. 2 is to number 140 the cells and the overlapped domains. Every cell has a key, which is a set of the domain numbers to which the cell belongs. Each cell has a class; the class of each cell is the number of elements (domain numbers) in its key. For example, individual cells having nodes (such nodes represented by dots in FIG. 5) at (mere) intersections 63 of the nodal graph, such as cell 45, are each only in one domain, with a class of one. Cells having their nodes (such nodes represented as circles in FIG. 5) on the edges 65 are in two overlapping domains with a class of two, while cells at graph nodes (such graph nodes represented as triangles in FIG. 5) at the vertices 70 are in four overlapping domains, with a class of four.

Referring again to FIG. 2, the next step is to group 150 the cells into connectors, each connector having a class, with each connector being the set of cells that share the same key. The class of each connector is the number of elements in the key of the connector. A connector of class n will thus separate connectors of class n−1 or lower.

Figure 6:
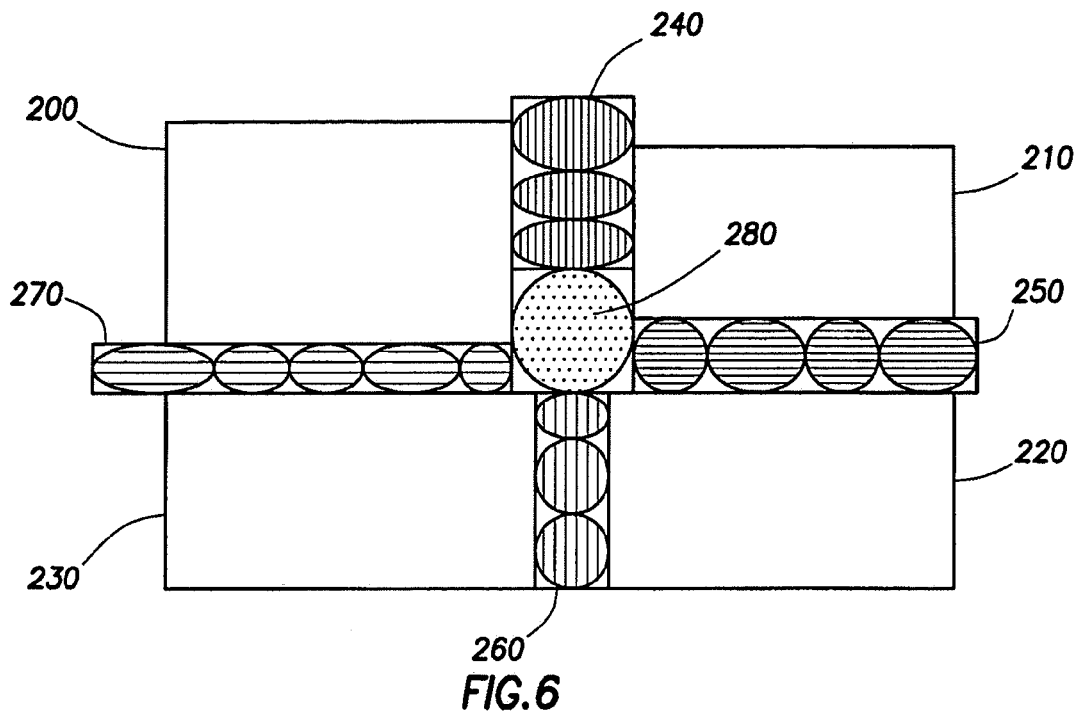
FIG. 6 depicts a simplified two-dimensional view of a group of connectors in accordance with a preferred embodiment of the present invention.

FIG. 6 depicts a simplified two-dimensional view of a group of connectors 200, 210, 220, 230, 240, 250, 260, 270, 280 in accordance with a preferred embodiment of the present invention, each connector being the set of cells having the same key. In FIG. 6, connector 200 is the set of cells having key [1] (that is, connector 200 includes cells that are only in overlapped domain one), connector 210 is the set of cells having key [2] (that is connector 210 includes cells that are only in overlapped domain one, connector 220 is the set of cells having key [3], connector 230 is the set of cells having key [4], connector 240 (cells that are heavily vertically striped) is the set of cells having key [1, 2] (that is, connector 240 includes cells that are in both overlapped domain one and overlapped domain two), connector 250 (cells that are heavily horizontally striped) is the set of cells having key [2,3], connector 260 (cells that are vertically striped) is the set of cells having key [3,4], connector 270 (cells that are horizontally striped) is the set of cells having key [4,1], and connector 280 is the set having a single cell (that is dotted) at a vertex which has key [1,2,3,4]. Connectors 200, 210, 220 and 230 are in class one and individual cells that make up these connectors are not depicted. Connectors 240, 250, 260 and 270 are in class 2 and separate connectors of class 1, which are neighbors of connectors 240, 250, 260 and 270. Connector 280 is in class 4 and separates connectors of classes 1 and 2. Connector 280 is a connector of the maximum class, which in the example of FIG. 6, is the class of four.

The relationship among cells can be represented mathematically. Let $D_i$, $i=1, \ldots, m$ denote a collection of sets. Each set contains the cell (or node) numbers corresponding to a domain or region of the grid (or nodal graph). These domains may be overlapped or non-overlapped by various well known methods previously mentioned and the union of all m regions is the entire grid (or nodal graph). For each cell i, $i=1, \ldots, n$ let $K_i$ denote the set of all domains which contain cell i. $K_i$ is called the key of cell i. Let V denote a set and let |V| denote the number of elements in set V. The class $c_i$ of cell i denotes the number of domains which contain cell i:

$$c_i = |K_i| \quad (Eq\ 3)$$

Define $L_j$ $j=1, \ldots, q$ as the set of cells of class j:

$$L_j = \{i | c_i = j\} \quad (Eq\ 4)$$

Let q denote the maximum class (which was four in the example of FIG. 6):

$$q = \max_{i=1,\ldots,n} (c_i) \quad (Eq\ 5)$$

Let $N_i$ denote the set of neighbor cells of cell i:

$$N_i = \{j | a_{ij} \neq 0 \text{ and } j \neq i\} \quad (Eq\ 6)$$

The neighbors of cell i may be referred to as $n_{i,r}$, $r=1, \ldots, |N_i|$. Let $$E = \bigcup_{i=1}^{n} \{K_i\}$$

the set of unique keys. E is a set consisting of v unique keys:

$$E = \{E_1, E_2, \ldots, E_v\} \quad (Eq\ 7)$$

such that $|E_1| \leq |E_2| \leq \ldots \leq |E_v|$.

The set of connectors $B_i$, $i=1 \ldots, v$ are such that $$B_i = \{x | K_x = E_i\} \quad (Eq\ 8)$$

Recall that a connector is the set of all cells having the same key and the class of the connector is the number of domains in its key. The class $\kappa_i$ of each connector $B_i$, $i=1, \ldots, v$ is defined as:

$$\kappa_i = |E_i| \quad (Eq\ 9)$$

Figure 13:
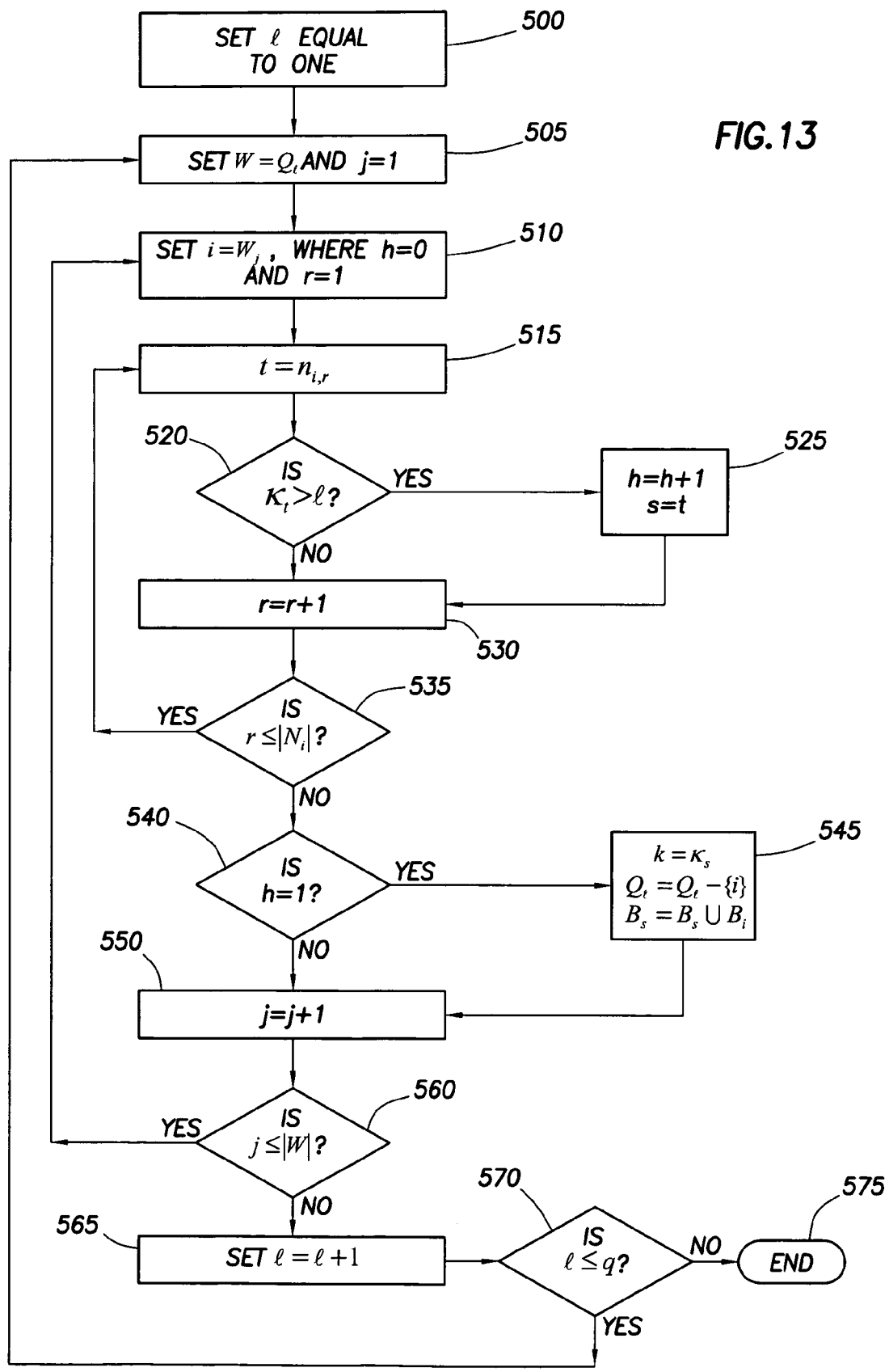
FIG. 13 depicts flowchart detailing step 152 of FIG. 2, in accordance with a preferred embodiment of the present invention.

Referring again to FIG. 2, start the ACC (algebraic cascading class) decomposition by performing the connector reduction step 152. Step 152 checks to see if any connector, represented herein by $B_i$, has only one higher order neighboring connector ("higher order neighbor" represented herein by $B_j$), that is, a neighboring connector having a higher class than the class of the connector $B_i$. FIG. 13 depicts an implementation of step 152 of FIG. 2. $N_i$ denotes the set of neighboring connector numbers of connector i, i=1, . . . , v. $Q_l$ denotes the set of connector numbers of class l. The symbol h is the number of high order neighbors that a connector has. Begin with class 1 connectors and proceed class by class to class q connectors. To do so, set 500 l equal to 1. Set 505 W equal to $Q_l$ and j=1. Set 510 i=$W_j$, where h=0 and r=1. Set 515 t=$n_{i,r}$. Determine 520 whether $\kappa_t > l$ and if so, set 525 h=1 and s=t. Set 530 r=r+1. Determine 535 whether r≦|$N_i$| and if so, go to step 515. If not, merge any connector $B_i$, having exactly one higher class neighboring connector $B_j$, into the higher class connector $B_j$ by determining 540 whether h=1 and, if so, set 545:

$k=\kappa_s$ $Q_l=Q_l-\{i\}$ $B_s=B_s \cup B_i$.

Then set 550 j=j+1. Determine 560 whether j≦|W| then go to step 510. Otherwise, set 565 l=l+1. Determine 570 whether l≦q and if so, go to step 505. Otherwise end 575 (and proceed to step 165 of FIG. 2).

A locally maximum class connector is defined as a connector whose class is greater than the class of each of its neighboring connectors. Referring again to FIG. 2, the next step in the ACC decomposition is to reset 165 the class $\kappa_j$ of all locally maximum class connectors $B_j$, to q, which is the maximum class of any connector.

$$\kappa_j = \max_{i=1,\ldots,v} |E_i| \quad \text{(Eq 10)}$$

In a preferred embodiment of the invention, referring again to FIG. 2, all maximum class connectors are forced 168 to contain only one cell. This is done by selecting one cell from each locally maximum class connector, deleting each one from its containing connector and forming a new connector of class q+1 from each selected cell. Then reset q to the value q+1.

Figure 12:
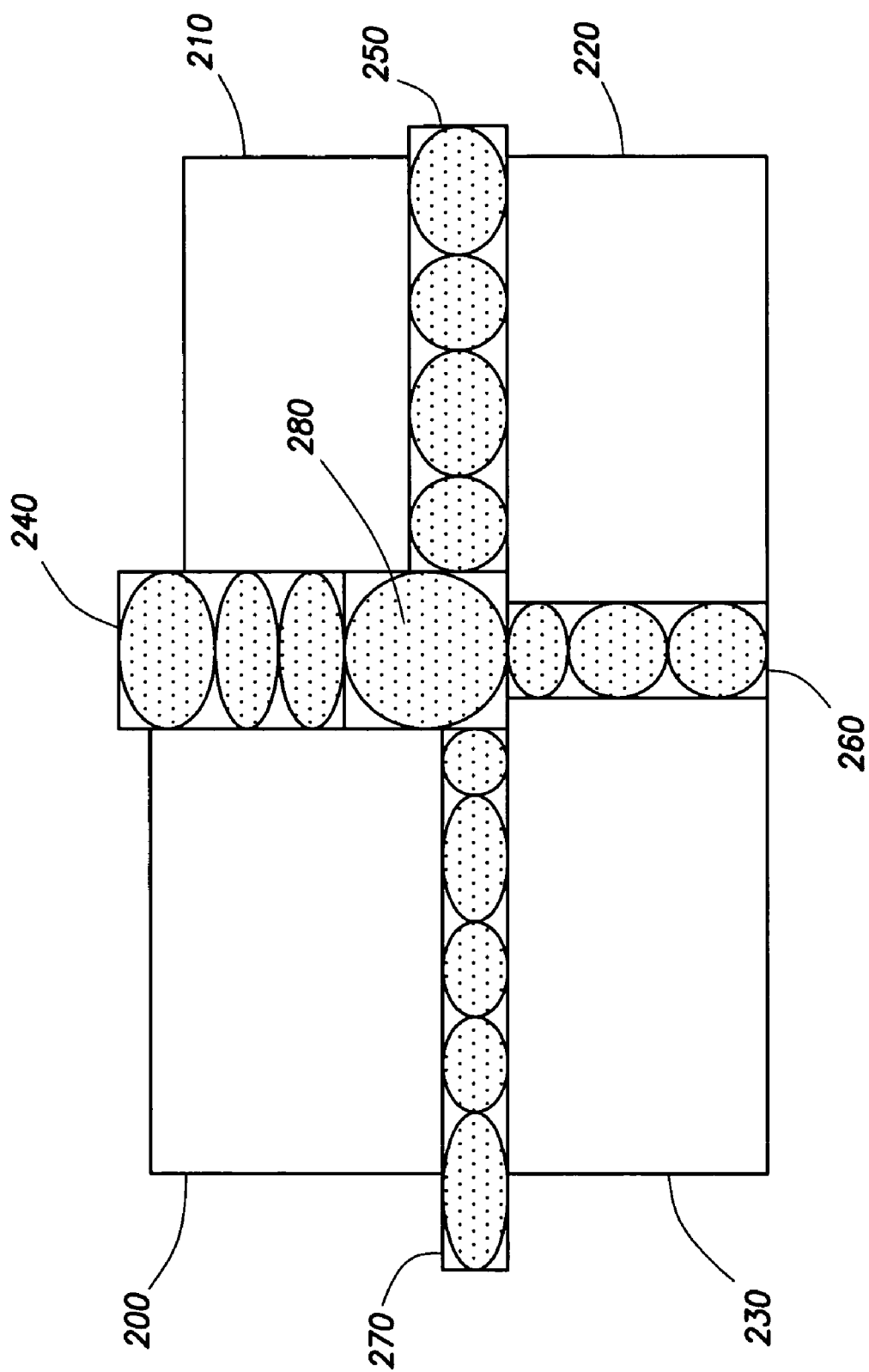
FIG. 12 depicts a result of implementing certain steps of FIG. 2, in accordance with a preferred embodiment of the present invention, on the subset of connectors depicted in FIG. 6.

The result of steps 160 and 165 on the subset of connectors depicted in FIG. 6 is depicted in FIG. 12. In FIG. 12, connectors 240, 250, 260 and 270 each have only one neighboring higher order connector (which is connector 280 for each of these), so each of connectors 240, 250, 260 and 270 have each been merged with connector 280 to form one large connector. (This is represented in FIG. 12 by all the cells in connectors 240, 250, 260 and 270 having the same dotted pattern.) Connectors 200, 210, 220 and 230 (the cells of which are not separately depicted) have more than one higher order neighboring connector, so connectors 200, 210, 220 and 230 are left unchanged.

For the step of 168, the cell originally forming connector 280 (see FIG. 6) could be selected, a new connector with the original connector 280 cell alone would then be formed and the class of the new connector containing only the original connector 280 cell would be increased from four to five.

Figure 7:
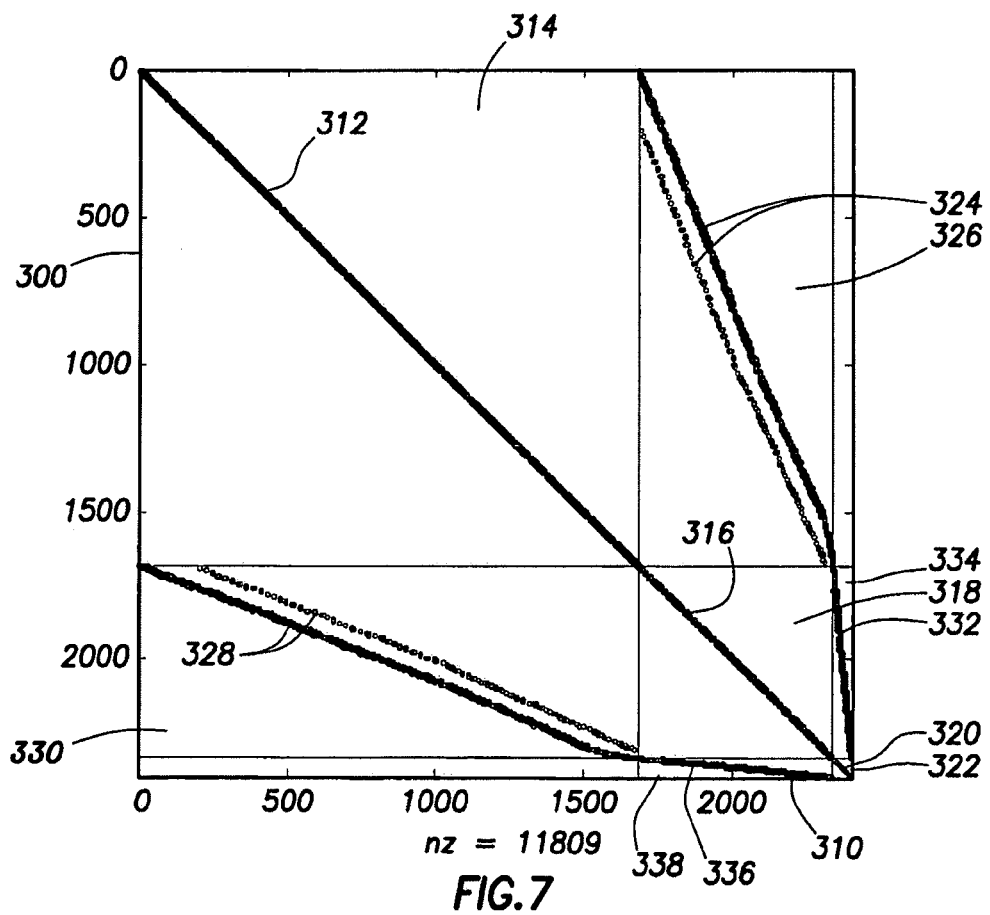
FIG. 7 depicts ACC ordering in accordance with a preferred embodiment of the present invention.
Figure 10:
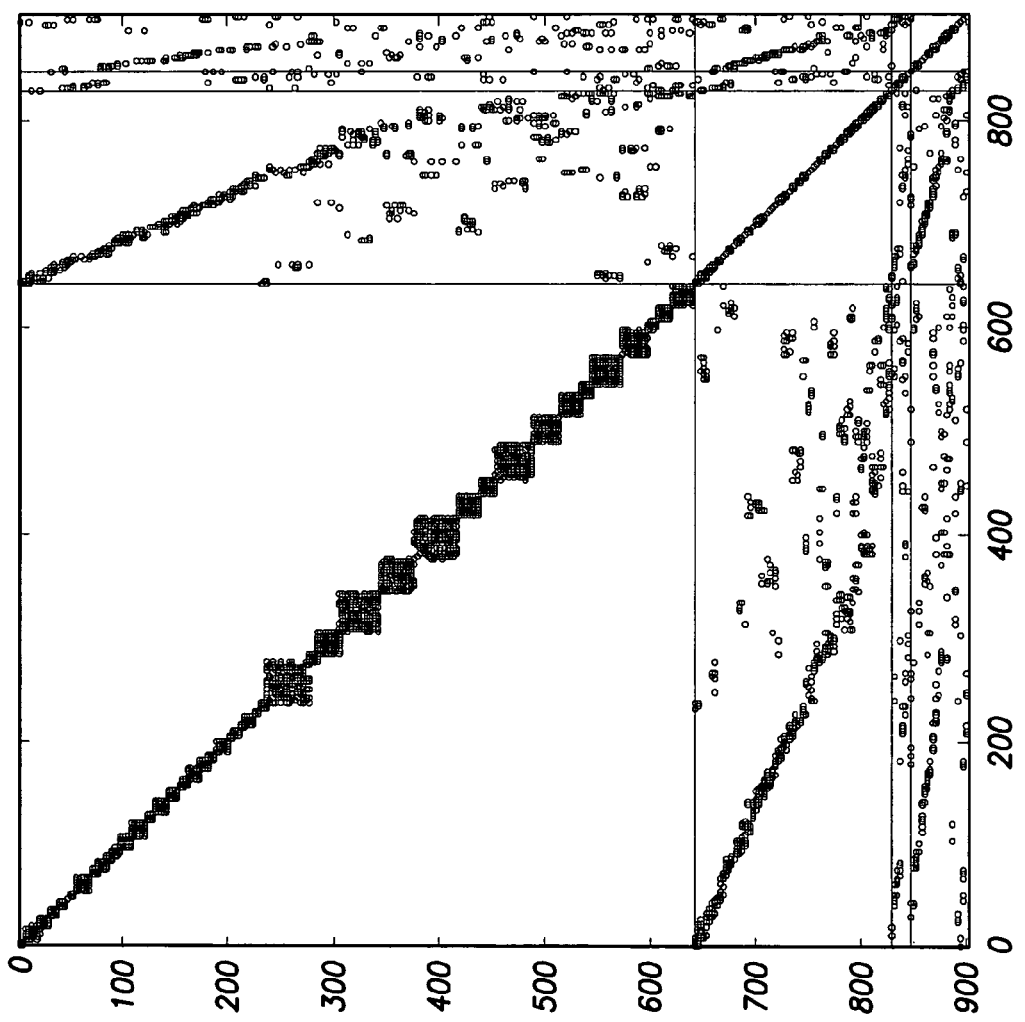
FIG. 10 depicts ACC ordering on a matrix structure in accordance with a preferred embodiment of the present invention.

Examples of ACC ordering are also plotted in FIGS. 7 and 10 discussed further herein.

Referring again to FIG. 2, we now order 170 (or re-order) the connectors in increasing order of class using permutation π, such that $$S_i = B_{\pi(i)} \quad \text{(Eq 11)}$$

where the class $\Omega_i$ of connector $S_i$ is $$\Omega_i = \kappa_{\pi(i)} \quad \text{(Eq 12)}$$

and $$\Omega_i \leq \Omega_{i+1} \ i=1, \ldots, v-1 \quad \text{(Eq 13)}$$

Then write connector $S_i$ in terms of its $n_i$ cells (nodes) as $$S_i = \{s_1^i, s_2^i, \ldots, s_{n_i}^i\} \quad \text{(Eq 14)}$$

This process may reduce the number of distinct classes.

The ACC ordering Ψ which maps cells (nodes) in their original order to the ACC order is:

m=0
  for i=1, v
    for k=1, $n_i$
      m=m+1
      Ψ($s_k^i$)=m
    end
  end Using the permutation Ψ in matrix form the equitation Ax=b becomes:

$$\tilde{A}y=\tilde{b} \quad \text{(Eq 15)}$$

where $$\tilde{A}=\Psi^T A \Psi \quad \text{(Eq 16)}$$

$$y=\Psi^T x \quad \text{(Eq 17)}$$

and $$\tilde{b}=\Psi^T b \quad \text{(Eq 18)}$$

The reordered matrix $\tilde{A}$ has the form $$\tilde{A} = \begin{bmatrix} \tilde{A}_{11} & \tilde{A}_{12} & \cdots & \tilde{A}_{1q} \\ \tilde{A}_{21} & \tilde{A}_{22} & \cdots & \tilde{A}_{2q} \\ \vdots & \vdots & \ddots & \vdots \\ \tilde{A}_{q1} & \tilde{A}_{q2} & \cdots & \tilde{A}_{qq} \end{bmatrix} \quad \text{(Eq 19)}$$

where each $\tilde{A}_{ii}$ i=1, . . . , q is block diagonal with blocks consisting of the connectors of class i.

$\tilde{A}$ may be approximately factored as:

$$\tilde{A} \approx LDU \quad \text{(Eq 20)}$$

where L is block lower triangular, U is block upper triangular and D is block diagonal.

In order to approximately solve $$\tilde{A}x=r \quad \text{(Eq 21)}$$

Next, referring again to FIG. 2, construct 172 an interpolation operator and restriction operator from ACC ordering. To do this, consider the equivalent system:

$$L^{-1}\tilde{A}U^{-1}y=L^{-1}r \quad \text{(Eq 22)}$$

where $$y=Ux \quad \text{(Eq 23)}$$

Since $$L^{-1}\tilde{A}U^{-1} \approx \begin{bmatrix} D_1 & & & \\ & D_2 & & \\ & & \ddots & \\ & & & D_q \end{bmatrix}$$ (Eq 24)

Then $$D_q \approx W^T L^{-1} \tilde{A} U^{-1} W$$ (Eq 25)

where $$W = \begin{bmatrix} 0 \\ \vdots \\ 0 \\ I \end{bmatrix}$$ (Eq 26)

where I is the identity matrix of the same dimensions as $\tilde{A}_{qq}$.

To simplify, the interpolation operator P is written as $$P = U^{-1}W$$ (Eq 27)

Figure 8:
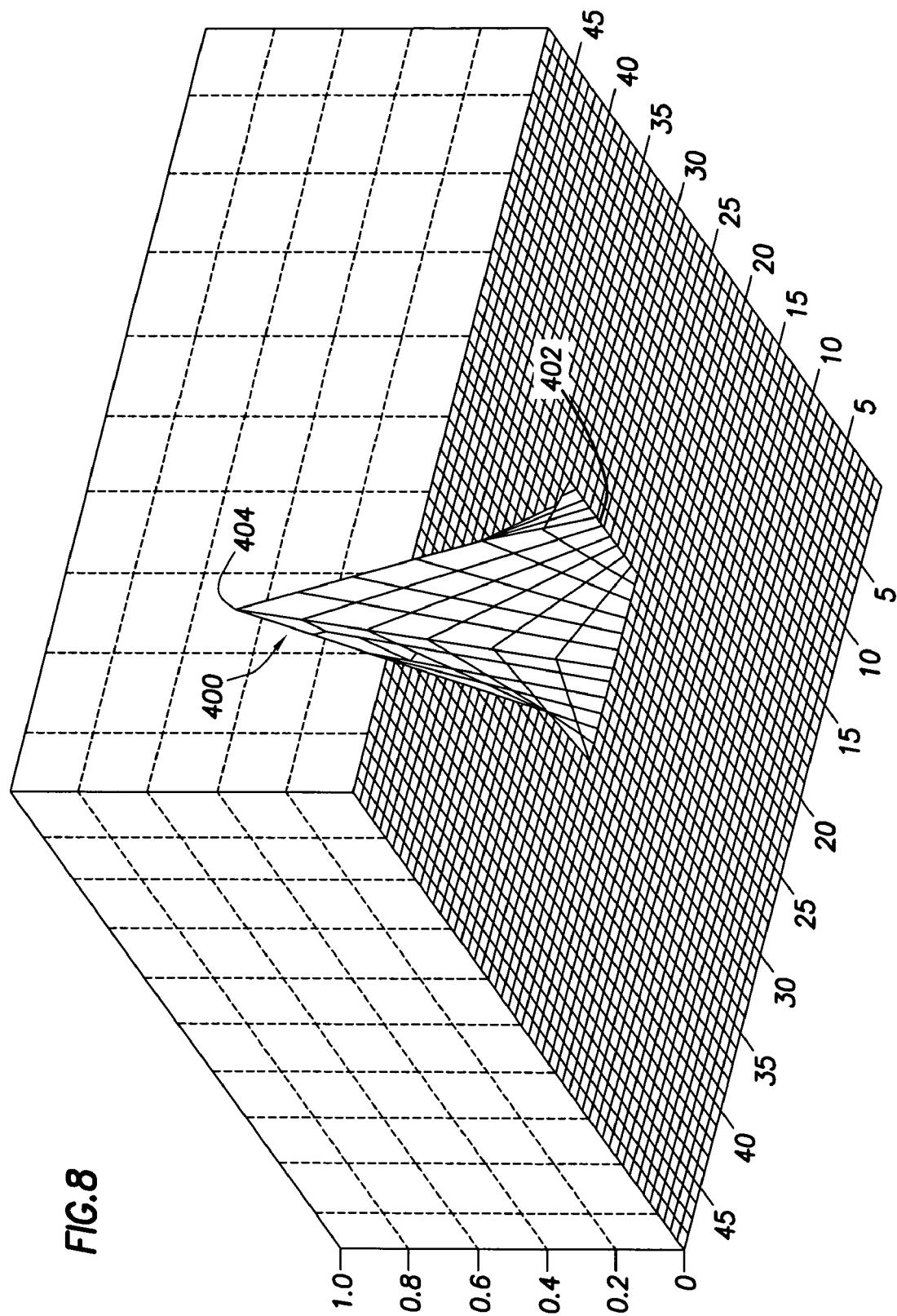
FIG. 8 depicts a multilinear basis function in accordance with a preferred embodiment of the present invention.

Each column of P represents a basis function. An example of P is depicted in FIG. 8, discussed further herein.

The restriction operator is written as $$R = W^T L^{-1}$$ (Eq 28)

Each row of R represents a second basis function. $R\tilde{A}P$ is a coarse grid matrix 174, and an $R\tilde{A}P$ example, in accordance with a preferred embodiment of the present invention, is plotted in FIG. 14 which is discussed further herein.

To use $R\tilde{A}P$ to solve a linear system, block q for vector y is $$y_q = (R\tilde{A}P)^{-1}Rr$$ (Eq 29)

the vector y is represented as $$y = y^* + Wy_q$$ (Eq 30)

Multiplying both sides on the left by $U^{-1}$ the original solution vector x is obtained as:

$$x = x^* + Py_q$$ (Eq 31)

Multiplying on the left by $\tilde{A}$ and rearranging:

$$\tilde{A}x^* = r - \tilde{A}Py_q$$ (Eq 32)

If M is some approximate factorization of $\tilde{A}$ then we have the approximate solution for $x^*$:

$$x^* \approx M^{-1}(r - \tilde{A}Py_q)$$ (Eq 33)

Then the two-step ACC preconditioning is given by:

$$x \approx M^{-1}(r - \tilde{A}Py_q) + Py_q$$ (Eq 34)

or $$x \approx M^{-1}(r - \tilde{A}P(R\tilde{A}P)^{-1}Rr) + P(R\tilde{A}P)^{-1}Rr$$ (Eq 35)

At this stage, the process may end 180.

The ACC algebraic coarse grid matrix $R\tilde{A}P$ is sparse and much smaller (perhaps by one or more orders of magnitude) than $\tilde{A}$ and thus the coarse grid linear solution may be performed in highly efficient fashion using either direct solution or iterative solutions using methods such as preconditioned GMRES or ORTHOMIN, or other inexact local solves such as block ILU(K), Nested Factorization, Line Gauss-Seidel. See Y. Saad and M. H. Schultz: "GMRES: a generalized minimal residual algorithm for solving nonsymmetric linear systems", *SIAM Journal on Scientific and Statistical Computing*, 7, PP 856-869, 1986; Vinsome, "P.K.W: "Orthomin, an Iterative Method for Solving Sparse Sets of Simultaneous Linear Equations", SPE 5729 presented at the Fourth Symposium of Numerical Simulation of Reservoir Performance of the Society of Petroleum Engineers of AIME held in Los Angeles, Calif., Feb. 19-20, 1976, all incorporated by reference.

The overall convergence rate of the preconditioning of the instant invention is typically greatly superior to commonly used methods such as ILU. Also the method is applicable to matrices arising from structured or unstructured grids including one-dimensional, two-dimensional or three-dimensional grids. In addition the method is applicable to matrices with one or more unknowns per cell (node).

FIG. 7 depicts an example of ACC ordering in accordance with a preferred embodiment of the present invention. The vertical axis 300 represents number of equations; the horizontal axis 310 represents number of unknowns.

The plot of FIG. 7 can be regarded as a series of rectangles having a plurality of plotted line segments. Plotted line segment 312 in rectangle 314 in the upper left hand corner, is a plot of ACC ordering for all domain class 1 cells, in rows 1-1600 on the horizontal axis 310. Plotted line segment 316 in rectangle 318 is a plot of ACC ordering for all domain class 2 cells, which are the cells on the edges. Plotted line segment 320 in very small rectangle 322 is a plot of ACC ordering for all domain class 4 cells, for the cells on the vertices.

Two rectangles border rectangle 314. Plotted line segments 324 in rectangle 326 represent non-zero couplings from class 1 cells to neighboring class 2 cells due to ACC ordering. Similarly, plotted line segments 328 in rectangle 330 represent non-zero couplings from class 2 cells to neighboring class 1 cells as a result of ACC ordering.

Plotted line segment 332 in rectangle 334 represent non-zero couplings from class 2 cells to neighboring class 4 cells. Similarly, plotted line segment 336 in rectangle 338 represent non-zero couplings from class 4 cells to neighboring class 2 cells due to ACC ordering.

FIG. 8 depicts an example of an interpolation operator P, specifically column 37 of a specific example of P for a two-dimensional grid, in accordance with a preferred embodiment of the present invention. (A three dimensional grid would yield a four dimensional P, which is less easy to represent in two dimensional figures.) The column 37 400 is a multilinear basis function and (loosely) resembles a pyramid with a base 402 (and surrounding area) representing P equal to zero and the tip 404 representing P equals one.

Figure 9:
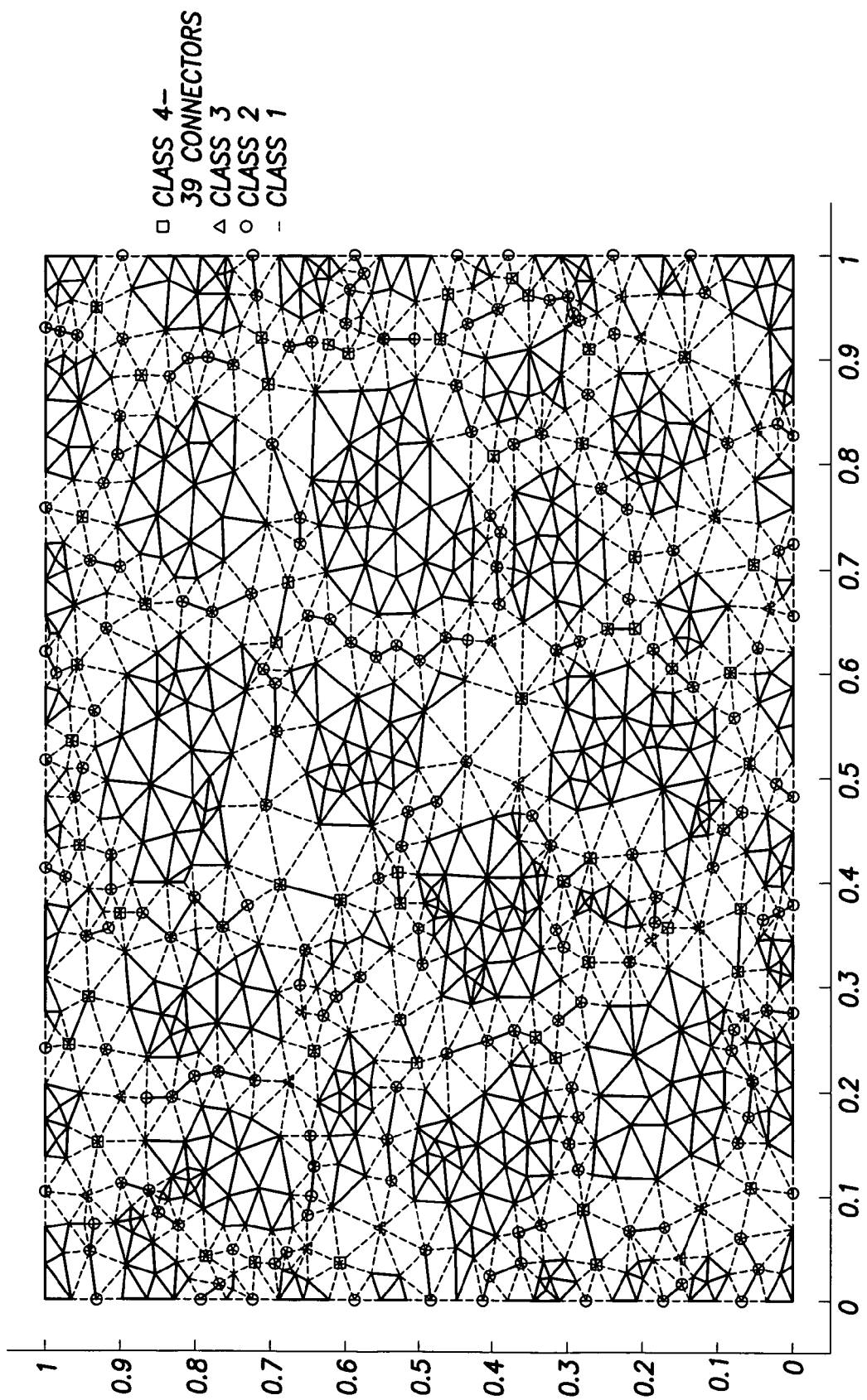
FIG. 9 depicts a finite element triangulation with 900 nodes (isotropic case) in accordance with a preferred embodiment of the present invention.

FIG. 9 depicts an example of a finite element triangulation with 900 nodes (isotropic case) in accordance with a preferred embodiment of the present invention. In the example of FIG. 9, squares represent class 4-39 connectors. Triangles represent class 3 connectors, circles represent class 2 connectors and dashed lines represent class 1 connectors.

FIG. 10, like FIG. 7, depicts an example of an ACC ordering on a matrix structure in accordance with a preferred embodiment of the present invention and is structured similarly. The example depicted in FIG. 10 has 4 connector classes.

Figure 11:
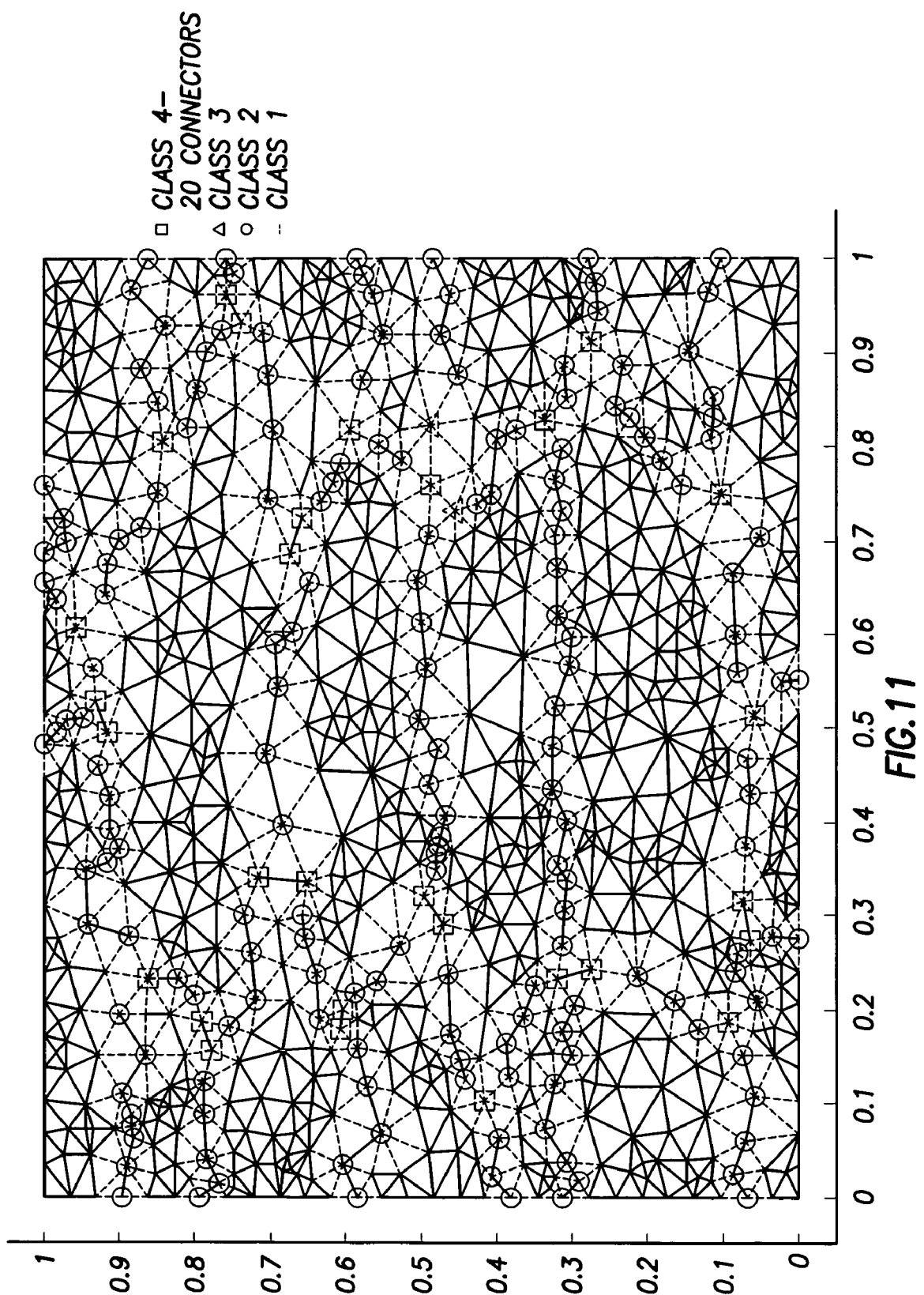
FIG. 11 depicts a finite element triangulation with 900 nodes (anisotropic case) in accordance with a preferred embodiment of the present invention.

FIG. 11 depicts an example of a finite element triangulation in accordance with a preferred embodiment of the present invention taken from the example of FIG. 10. FIG. 11 illustrates an example with 900 nodes (anisotropic case). In the example of FIG. 11, squares represent class 4-20 connectors. Triangles represent class 3 connectors, circles represent class 2 connectors and dashed lines represent class 1 connectors.

Figure 14:
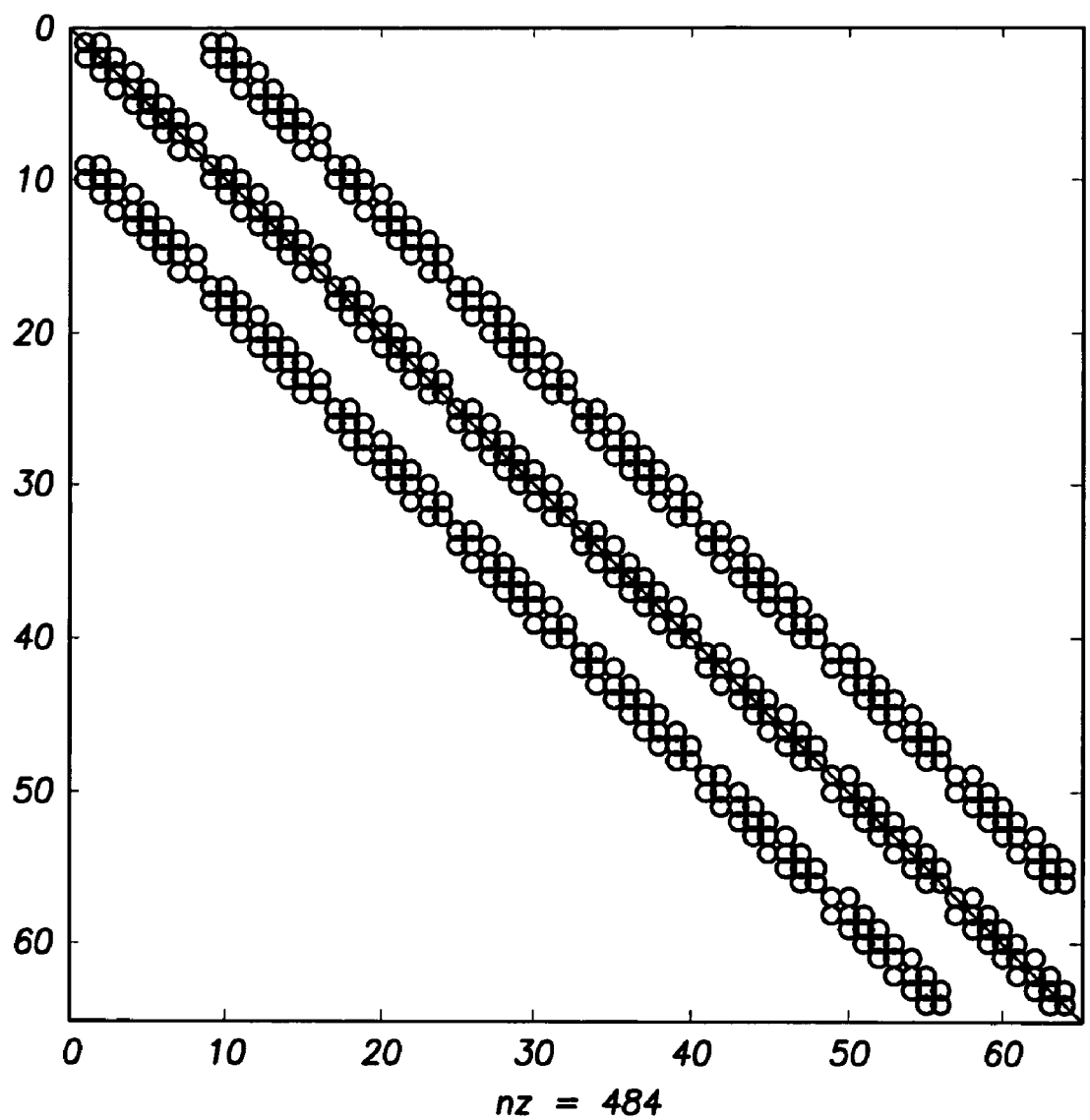
FIG. 14 depicts an example of a plot of RÃP, a coarse grid matrix, in accordance with a preferred embodiment of the present invention.

FIG. 14 depicts an example of the ACC algebraic coarse grid matrix RÂP, illustrating a sparsity pattern of an 8-by-8 coarse grid in accordance with a preferred embodiment of the present invention. The y-axis corresponds to coarse grid equations and the x-axis corresponds to coarse grid unknowns.

Although the foregoing is provided for purposes of illustrating, explaining and describing certain embodiments of the invention in particular detail, modifications and adaptations to the described methods, systems and other embodiments will be apparent to those skilled in the art and may be made without departing from the scope or spirit of the invention.

What is claimed is:

1. A method for conducting a reservoir simulation with the use of a reservoir model of a region of interest of a reservoir, the region of interest having been gridded into a plurality of cells, each cell having one or more unknown variable, each cell having a node, comprising the steps of:
   a) creating, using a computer, a graph of the cell nodes;
   b) imposing, using the computer, an initial decomposition of the graph into a pre-specified number of domains, such that each cell exists in at least one domain;
   c) numbering, using the computer, the cells and the domains, each cell having a key and each cell having a class, wherein a key of each cell is a set of domain numbers to which the cell belongs and the class of each cell being the number of elements in the cell's key;
   d) grouping, using the computer, the cells into connectors, each connector being a set of cells that share a same key, with each connector having a connector class, the connector class being the number of elements in a key of each connector;
   e) performing, using the computer, a connector reduction step to merge each connector that includes only one higher-order neighbor connector with such higher-order neighbor connector, wherein such higher-order neighbor has a higher class than the corresponding connector;
   f) resetting, using the computer, a class of all locally maximum class connectors to a maximum class held by any connector;
   g) forcing, using the computer, each of the locally maximum class connectors to contain only one cell;
   h) ordering, using the computer, the connectors in increasing order of class;
   i) constructing, using the computer, an interpolation operator and a restriction operator from the ordered connectors;
   j) using the interpolation operator and restriction operator to construct, using the computer, a coarse grid;
   k) conducting the reservoir simulation based on the coarse grid; and
   l) displaying the reservoir simulation.

2. The method of claim 1 further comprising using the coarse grid to determine the unknown variables of the cells.

3. The method of claim 1 further comprising using results of the reservoir simulation to identify opportunities for improving production from the reservoir.

4. The method of claim 3 further comprising acting upon at least one of the opportunities to improve production from the reservoir.

5. The method of claim 1, wherein the gridding is structured.

6. The method of claim 1, wherein the gridding is unstructured.

7. The method of claim 1 wherein the graph is two dimensional.

8. The method of claim 1 wherein the graph is three dimensional.

9. The method of claim 1 wherein displaying the reservoir simulation is done on a computer monitor.

10. The method of claim 1 wherein displaying the reservoir simulation is done on a three dimensional display system.

11. The method of claim 1 wherein the graph is at least two-dimensional and further comprising using the coarse grid to determine the unknown variables of the cells and displaying the reservoir simulation.

12. The method of claim 1 wherein the interpolation operator has one or more columns and each column represents a basis function.

13. The method of claim 1, wherein a sparse matrix is used to represent the graph, the sparse matrix taking the form of:

$$A = \{a_{ij}\}_{i,j=}^{n}$$

where n is the number of cells.

14. A program storage device readable by a machine, tangibly embodying a program of instructions that when executed cause the machine to perform method steps for conducting a reservoir simulation using a reservoir model of a reservoir wherein a region of interest of the reservoir has been gridded into a plurality of cells, each cell having one or more unknown variable, each cell having a node, said method steps comprising:
   a) creating a graph of the cell nodes;
   b) imposing an initial decomposition of the graph into a pre-specified number of domains, such that each cell exists in at least one domain;
   c) numbering the cells and the domains, each cell having a key and each cell having a class, wherein the key of each cell is a set of domain numbers to which the cell belongs and the class of each cell being the number of elements in the key of the cell;
   d) grouping the cells into connectors, each connector being a set of cells that share the same key, with each connector having a connector class, the connector class being the number of elements in key of each connector;
   e) performing a connector reduction step to merge each connector that includes only one higher-order neighbor connector with such higher-order neighbor connector, wherein such higher-order neighbor has a higher class than the corresponding connector;
   f) resetting a class of all locally maximum class connectors to a maximum class held by any connector;
   g) forcing each of the locally maximum class connectors to contain only one cell;
   h) ordering the connectors in increasing order of class;
   i) constructing an interpolation operator and a restriction operator from the ordered connectors; and
   j) using the interpolation operator and restriction operator to construct a coarse grid;
   k) conducting the reservoir simulation based on the coarse grid; and
   l) displaying the reservoir simulation.

15. The program storage device of claim 14, said method steps further comprising using the coarse grid to determine the unknown variables of the cells.

16. The program storage device of claim 14 wherein the reservoir is a hydrocarbon reservoir and the method steps further comprising using results of the reservoir simulation to identify opportunities for improving production from the reservoir.

17. The program storage device of claim 14, wherein the grid is structured.

18. The program storage device of claim 14, wherein the grid is unstructured.

19. The program storage device of claim 14, wherein the graph is two dimensional.

20. The program storage device of claim 14, wherein the graph is three dimensional.

21. The program storage device of claim 14 wherein the displaying the reservoir simulation is performed on a computer monitor.

22. The program storage device of claim 14 wherein the displaying the reservoir simulation is performed on a three-dimensional display system.

23. The program storage device of claim 14 comprises a compact disk.

24. The program storage device of claim 14 comprises memory on a computer hard drive.

25. The program storage device of claim 14, wherein a sparse matrix is used to represent the graph, the sparse matrix taking the form of:

$$A=\{a_{ij}\}_{i,j=1}^{n}$$

where n is the number of cells.

26. A computer system responsive to input data, adapted for solving a system of linear equations that represent a particular entity, said computer system generating a set of simulation results when said system of linear equations are solved, said set of simulation results including one or more parameters which characterize said particular entity, wherein a representation of the entity has been gridded into cells, each cell having one or more unknown variable, each cell having a node, comprising:
  a processor; and
  a memory comprising software instructions for enabling the computer system under control of the processor to perform method steps of:
    a) constructing a graph of the cell nodes;
    b) imposing an initial decomposition of the graph into a pre-specified number of domains, such that each cell exists in at least one domain;
    c) numbering the cells and the domains;
    d) assigning each cell a key such that the key of each cell is a set of domain numbers to which the cell belongs;
    e) assigning each cell a class, the class of each cell being the number of elements in the cell's key;
    f) grouping the cells into connectors, each connector being a set of cells that share the same key, with each connector having a connector class, the connector class being the number of elements in a key of each connector;
    g) performing a connector reduction step to merge each connector that includes only one higher-order neighbor connector with such higher-order neighbor connector, wherein such higher-order neighbor has a higher class than the corresponding connector;
    h) resetting a class of all locally maximum class connectors to a maximum class held by any connector;
    i) forcing each of the locally maximum class connectors to contain only one cell;
    j) ordering the connectors in increasing order of class;
    k) constructing an interpolation operator and a restriction operator from the ordered connectors; and
    l) using the interpolation operator and restriction operator to construct a coarse grid;
    m) generating the set of simulation results based on the coarse grid; and
    n) displaying the set of simulation results.

27. The computer system of claim 26, the method steps further comprising using the coarse grid to determine the unknown variables of the cells.

28. The computer system of claim 26, the method steps further comprising using results from the computer system to identify opportunities for improving production from the reservoir.

29. The computer system of claim 26, wherein the particular entity is a water producing reservoir.

30. The computer system of claim 29, the method steps further comprising using results from the computer system to identify opportunities for improving water production from the reservoir.

31. The computer system of claim 29, the method steps further comprising using results from the computer system to identify opportunities for inhibiting salt water contamination of the reservoir.

32. The computer system of claim 26, wherein the grid is structured.

33. The computer system of claim 26, wherein the grid is unstructured.

34. The computer system of claim 26, wherein the graph is two dimensional.

35. The computer system of claim 26, wherein the graph is three dimensional.

36. The computer system of claim 26 wherein the displaying of the set of simulation results is performed on a computer monitor.

37. The computer system of claim 26 wherein the displaying of the set of simulation results is performed on a three-dimensional display system.

38. The computer system of claim 26, wherein a sparse matrix is used to represent the graph, the sparse matrix taking the form of:

$$A=\{a_{ij}\}_{i,j=1}^{n}$$

where n is the number of cells.

39. A computer system responsive to a set of input data for displaying a gridded representation of an earth formation comprised of a plurality of grid cells and a plurality of simulation results associated with, respectively, with the plurality of cells, each cell having one or more unknown variable, each cell having a node, comprising:
  a processor; and
  a memory comprising software instructions for enabling the computer system under control of the processor to perform method steps of:
    a) creating a graph of the cell nodes;
    b) imposing an initial decomposition of the graph into a pre-specified number of domains, such that each cell exists in at least one domain;
    c) numbering the cells and the domains,
    d) assigning each cell a key such that the key of each cell is a set of domain numbers to which the cell belongs;
    e) assigning each cell a class, the class of each cell being the number of elements in the cell's key;
    f) grouping the cells into connectors, each connector being a set of cells that share the same key, with each connector having a connector class, the connector class being the number of elements in a key of each connector;
    g) performing a connector reduction step to merge each connector that includes only one higher-order neighbor connector with such higher-order neighbor connector, wherein such higher-order neighbor has a higher class than the corresponding connector;

h) resetting a class of all locally maximum class connectors to a maximum class held by any connector;
i) forcing each of the locally maximum class connectors to contain only one cell;
j) ordering the connectors in increasing order of class;
k) constructing an interpolation operator and a restriction operator from the ordered connectors;
l) using the interpolation operator and restriction operator to construct a coarse grid;
m) generating the gridded representation based on the coarse grid; and
n) displaying the gridded representation.

40. The computer system of claim 39, the method steps further comprising using the coarse grid to determine the unknown variables of the cells.

41. The computer system of claim 39, the method steps further comprising using results of the gridded representation to identify opportunities for improving production from the earth formation.

42. The computer system of claim 39 wherein the grid is structured.

43. The computer system of claim 39, wherein the grid is unstructured.

44. The computer system of claim 39, wherein the graph is two dimensional.

45. The computer system of claim 39 wherein the graph is three dimensional.

46. The computer system of claim 39 wherein the display includes a computer monitor.

47. The computer system of claim 46 wherein the display includes a three-dimensional display system.

48. The computer system of claim 39 wherein a sparse matrix is used to represent the graph, the sparse matrix taking the form of:

$$A = \{a_{ij}\}_{i,j=1}^{n}$$

where n is the number of cells.

49. A method for conducting a reservoir simulation with the use of a reservoir model of a zone of interest, the zone of interest having been gridded into a plurality of cells, each cell having one or more unknown variable, comprising the steps of:
a) imposing an initial decomposition of the grid into a pre-specified number of regions, such that each cell exists in at least one region;
b) numbering the cells and the regions, each cell having a key and each cell having a class, wherein the key of each cell is a set of region numbers to which the cell belongs and the class of each cell being the number of elements in the cell's key;
c) grouping the cells into connectors, each connector being a set of cells that share the same key, with each connector having a connector class, the connector class being the number of elements in a key of each connector;
d) performing a connector reduction step to merge each connector that includes only one higher-order neighbor connector with such higher-order neighbor connector, wherein such higher-order neighbor has a higher class than the corresponding connector;
e) resetting a class of all locally maximum class connectors to a maximum class held by any connector;
f) forcing each of the locally maximum class connectors to contain only one cell;
g) ordering the connectors in increasing order of class;
h) constructing interpolation operator and restriction operator from the ordered connectors; and
i) using the interpolation operator and restriction operator to construct a coarse grid
j) conducting the reservoir simulation based on the coarse grid; and
k) displaying the reservoir simulation.

50. The method of claim 49, further comprising using the coarse grid to determine the unknown variables of the cells.

51. The method of claim 49 wherein the gridding is structured.

52. The method of claim 49 wherein the gridding is unstructured.

53. The method of claim 49 wherein the graph is two dimensional.

54. The method of claim 49 wherein the graph is three dimensional.

55. A program storage device readable by a machine, tangibly embodying a program of instructions that when executed cause the machine to perform method steps for conducting a reservoir simulation using a reservoir model wherein a zone of interest has been finely gridded into a plurality of cells, each cell having one or more unknown variable, said method steps comprising:
a) imposing an initial decomposition of the grid into a pre-specified number of regions, such that each cell exists in at least one region;
b) numbering the cells and the regions, each cell having a key and each cell having a class, wherein the key of each cell is a set of region numbers to which the cell belongs and the class of each cell being the number of elements in the key of the cell;
c) grouping the cells into connectors, each connector being a set of cells that share the same key, with each connector having a connector class, the connector class being the number of elements in a key of each connector;
d) performing a connector reduction step to merge each connector that includes only one higher-order neighbor connector with such higher-order neighbor connector, wherein such higher-order neighbor has a higher class than the corresponding connector;
e) resetting a class of all locally maximum class connectors to a maximum class held by any connector;
f) forcing each of the locally maximum class connectors to contain only one cell;
g) ordering the connectors in increasing order of class;
h) constructing interpolation operator and restriction operator from the ordered connectors;
i) using the interpolation operator and restriction operator to construct a coarse grid solution;
j) using the coarse grid solution to determine the unknown variables of the cells; and
k) using the interpolation operator with the coarse grid solution to re-construct the fine grid.

56. The method of claim 1 wherein the graph of the cell nodes is fine.

57. The method of claim 56 further comprising using the interpolation operator with the coarse grid to re-construct the fine graph.

* * * * *

UNITED STATES PATENT AND TRADEMARK OFFICE
CERTIFICATE OF CORRECTION

| | |
|---|---|
| PATENT NO. | : 7,684,967 B2 |
| APPLICATION NO. | : 11/453304 |
| DATED | : March 23, 2010 |
| INVENTOR(S) | : John Wallis et al. |

It is certified that error appears in the above-identified patent and that said Letters Patent is hereby corrected as shown below:

On the title page, item [73] Assignee, add:

Chevron U.S.A. Inc., San Ramon, CA (US).

Signed and Sealed this

Tenth Day of August, 2010

David J. Kappos
*Director of the United States Patent and Trademark Office*